(12) United States Patent
Ikedo

(10) Patent No.: US 11,917,300 B2
(45) Date of Patent: Feb. 27, 2024

(54) IMAGE PICKUP APPARATUS AND IMAGE PICKUP ELEMENT, WHICH ARE CAPABLE OF PERFORMING APPROPRIATE CORRECTION PROCESSING THAT SUPPRESSES INFLUENCE OF HIGH LUMINANCE LIGHT, CONTROL METHOD FOR IMAGE PICKUP APPARATUS, AND STORAGE MEDIUM

(71) Applicant: CANON KABUSHIKI KAISHA, Tokyo (JP)

(72) Inventor: Hideki Ikedo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/699,301

(22) Filed: Mar. 21, 2022

(65) Prior Publication Data

US 2022/0321753 A1  Oct. 6, 2022

(30) Foreign Application Priority Data

Mar. 30, 2021 (JP) ................. 2021-057793

(51) Int. Cl.
*H04N 23/71* (2023.01)
*H04N 23/75* (2023.01)

(52) U.S. Cl.
CPC ............. *H04N 23/71* (2023.01); *H04N 23/75* (2023.01)

(58) Field of Classification Search
CPC ....... H04N 23/71; H04N 23/75; H04N 23/617
See application file for complete search history.

(56) References Cited

U.S. PATENT DOCUMENTS

| 5,497,196 A * | 3/1996 | Nishida ............... H04N 23/71 348/E5.04 |
| 10,616,478 B2 * | 4/2020 | Jung ................. H04N 23/635 |
| 2016/0241782 A1 * | 8/2016 | Fujita ............... H04N 23/698 |
| 2017/0094202 A1 * | 3/2017 | Kobayashi ........... H04N 25/75 |

FOREIGN PATENT DOCUMENTS

| JP | 2007-158830 A | 6/2007 |
| JP | 2014-175778 A | 9/2014 |
| WO | 2017/168665 A1 | 10/2017 |

* cited by examiner

*Primary Examiner* — Luong T Nguyen
(74) *Attorney, Agent, or Firm* — Cowan, Liebowitz & Latman, P.C.

(57) ABSTRACT

An image pickup apparatus capable of performing an appropriate correction processing that suppresses an influence of high luminance light is provided. The image pickup apparatus comprising at least one processor and/or circuit configured to function as inferring a luminance of a high luminance subject having a pixel signal saturation level or higher based on image signals generated from a plurality of pixels, and determining an area for obtaining a correction value used when correcting the image signals based on the inferred luminance of the high luminance subject.

15 Claims, 14 Drawing Sheets

IMAGE PICKUP APPARATUS AND IMAGE PICKUP ELEMENT, WHICH ARE CAPABLE OF PERFORMING APPROPRIATE CORRECTION PROCESSING THAT SUPPRESSES INFLUENCE OF HIGH LUMINANCE LIGHT, CONTROL METHOD FOR IMAGE PICKUP APPARATUS, AND STORAGE MEDIUM

BACKGROUND OF THE INVENTION

Field of the Invention

The present invention relates to an image pickup apparatus and an image pickup element, which are capable of performing an appropriate correction processing that suppresses an influence of high luminance light, a control method for the image pickup apparatus, and a storage medium.

Description of the Related Art

An image sensor such as a CCD (Charge Coupled Device) image sensor or a CMOS (Complementary Metal Oxide Semiconductor) image sensor mounted on an image pickup apparatus such as a digital camera is provided with optical black pixels (hereinafter, referred to as "OB pixels") in a part of a pixel area. A black level correction processing, which adjusts a black level to a reference value, is performed by using output signals of the OB pixels. Here, when the black level correction processing using the output signals of the OB pixels is performed, sometimes high luminance light from a high luminance subject such as the sun enters into the vicinity of an OB pixel area. In this case, even though the OB pixels are shielded from light, sometimes the light leaked from adjacent aperture pixels affects the OB pixel area. When the light leaked from the aperture pixels affects the OB pixels, the output signals of the OB pixels are no longer signals showing a normal value, and the black level correction processing will not be performed appropriately. If the black level correction is not performed appropriately, sometimes picked-up images will have unnatural coloring or the like.

As related techniques, techniques disclosed in Japanese Laid-Open Patent Publication (kokai) No. 2007-158830 and Japanese Laid-Open Patent Publication (kokai) No. 2014-175778 have been proposed. The technique disclosed in Japanese Laid-Open Patent Publication (kokai) No. 2007-158830 detects that an output level in an OB unit changes according to a distance from an effective pixel unit, and changes an OB area for calculating a dark level according to the detection result. Further, the technique disclosed in Japanese Laid-Open Patent Publication (kokai) No. 2014-175778 performs a gain correction with respect to AD (analog-to-digital) conversion values of pixel signals arranged in a column determined to have been incident with high luminance light of a predetermined level or higher based on a gain value corresponding to a distance from the position of the pixel where the high luminance light of the predetermined level or higher is incident. Further, in recent years, CNNs (convolutional neural networks) have been used for image recognition. As a related technique, a technique disclosed in International Publication No. WO/2017/168665 has been proposed. The technique disclosed in International Publication No. WO/2017/168665 realizes feature extraction using CNN by means of a single sensor with a laminate structure.

For example, sometimes the image sensor (an image pickup element) has shading in the amount of a dark current within the pixel area due to variations, etc. in manufacturing. In such a case, by using the technique disclosed in Japanese Laid-Open Patent Publication (kokai) No. 2007-158830, there is a possibility to erroneously detect light leakage to the OB pixels. Further, the technique disclosed in Japanese Laid-Open Patent Publication (kokai) No. 2014-175778 only detects the high luminance light based on whether or not the output of the pixel signal is equal to or higher than a saturation level. The higher a luminance level, the more likely it is that light leaks to the OB pixels, but even for a high luminance subject with a luminance equal to or higher than the saturation level, the pixel signal can only show up to the saturation level. Therefore, since it is not possible to detect the original luminance level of the high luminance subject with the luminance equal to or higher than the saturation level, it is not possible to correctly determine the magnitude of the influence of the light leakage from the output of the pixel signal to the OB pixel. In such a case, sometimes it is not possible to appropriately perform a correction processing such as the black level correction processing. Further, the technique disclosed in International Publication No. WO/2017/168665 does not solve a problem that it is not possible to appropriately perform the correction processing such as the black level correction processing.

SUMMARY OF THE INVENTION

The present invention provides an image pickup apparatus and an image pickup element, which are capable of performing an appropriate correction processing that suppresses an influence of high luminance light, a control method for the image pickup apparatus, and a storage medium.

Accordingly, the present invention provides an image pickup apparatus comprising at least one processor and/or circuit configured to function as inferring a luminance of a high luminance subject having a pixel signal saturation level or higher based on image signals generated from a plurality of pixels, and determining an area for obtaining a correction value used when correcting the image signals based on the inferred luminance of the high luminance subject.

According to the present invention, it is possible to perform the appropriate correction processing that suppresses the influence of the high luminance light.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, each embodiment of the present invention will be described in detail with reference to the drawings. However, the configurations described in the following embodiments are merely examples, and the scope of the present invention is not limited by the configurations described in the respective embodiments.

Figure 1:
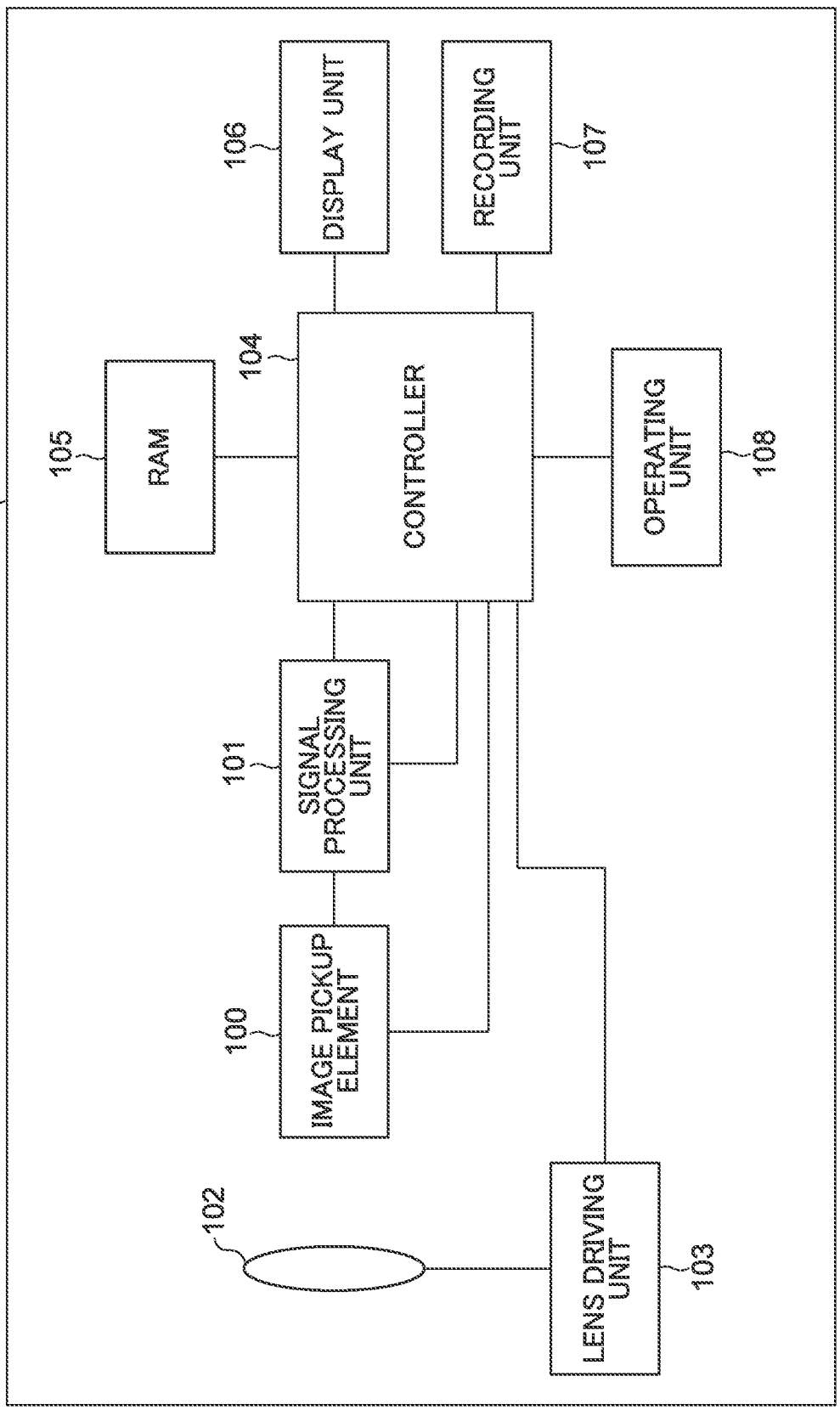
FIG. 1 is a diagram that shows an example of the configuration of an image pickup apparatus.

At first, a first embodiment of the present invention will be described. FIG. 1 is a diagram that shows an example of the configuration of an image pickup apparatus 10. The image pickup apparatus 10 includes an image pickup element 100, a signal processing unit 101, a photographing lens 102, a lens driving unit 103, a controller 104, a RAM (Random Access Memory) 105, a display unit 106, a recording unit 107, and an operating unit 108. The image pickup element 100 captures a subject, which is image-formed via the photographing lens 102, as incident light. In the image pickup element 100, a plurality of pixels including a photodiode as a photoelectric conversion unit are arranged in a matrix. Each pixel of the image pickup element 100 generates a pixel signal corresponding to the incident light, and outputs the generated pixel signal. The pixel signals outputted by a plurality of pixels constitute an image signal.

The photographing lens 102 forms an optical image of the subject on the image pickup element 100. The lens driving unit 103 performs a zoom control, a focus control, an aperture control, etc. with respect to the photographing lens 102. The signal processing unit 101 performs a signal processing such as sorting with respect to the image signals outputted by the image pickup element 100. The controller 104 is realized by a CPU (Central Processing Unit) or the like, and performs various kinds of controls. By the controller 104 (the CPU) executing a predetermined program, controlling as the controller 104 of each embodiment is realized. The RAM 105 temporarily stores various kinds of information, the image signals, etc. The display unit 106 displays various kinds of information, the image signals, etc.

The recording unit 107 is a recording device such as a semiconductor memory for recording or reading out the image signals, and is capable of being attached to/detached from the image pickup element 100. The operating unit 108 includes buttons, dials, and the like, and can perform various kinds of operations from a user. The display unit 106 and the operating unit 108 may be a touch panel display integrally configured.

Figure 2:
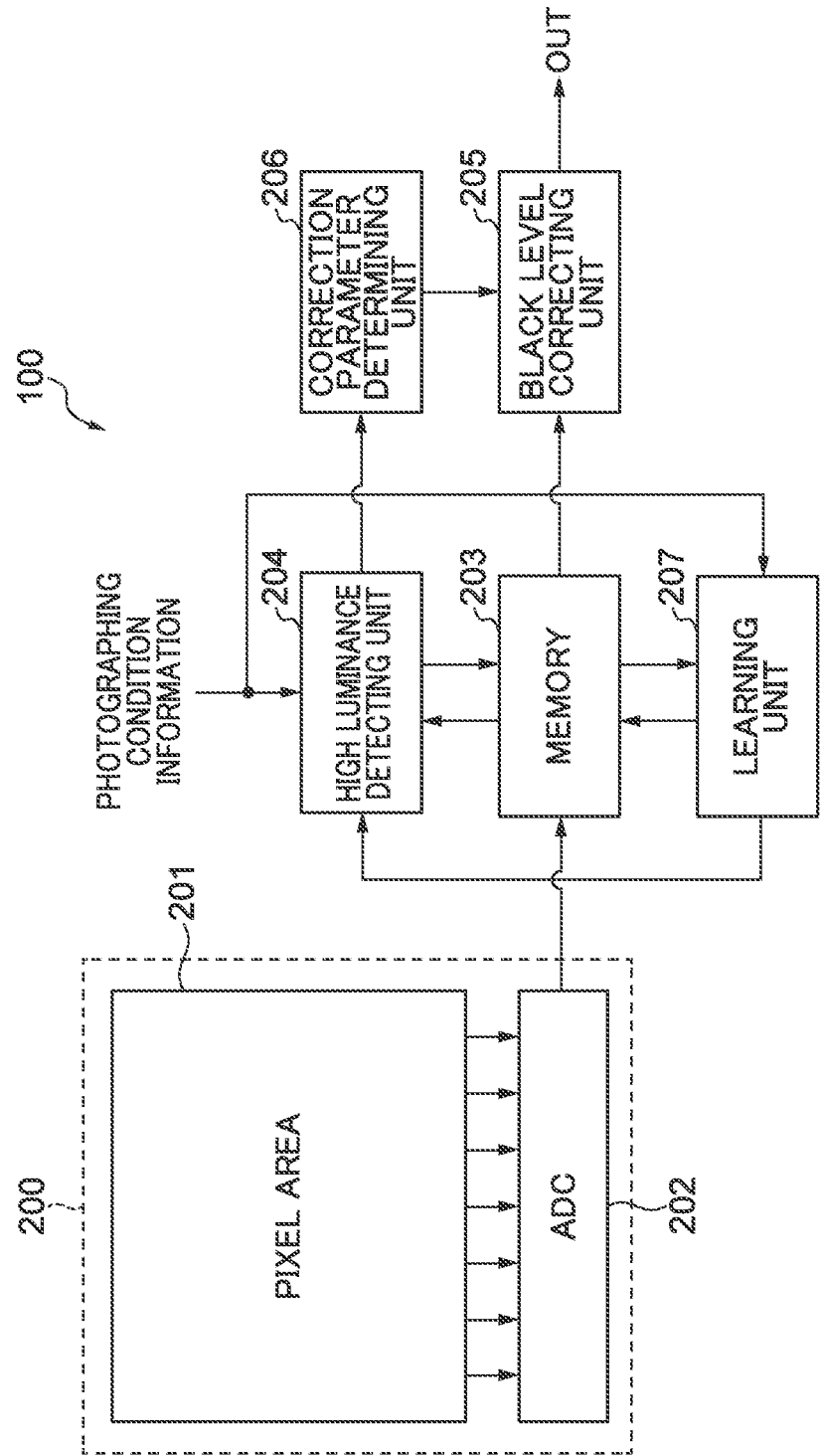
FIG. 2 is a diagram that shows an example of an image pickup element according to a first embodiment of the present invention.

FIG. 2 is a diagram that shows an example of the image pickup element 100 according to the first embodiment. The image pickup element 100 includes an image signal generating unit 200, a memory 203, a high luminance detecting unit 204, a black level correcting unit 205, a correction parameter determining unit 206, and a learning unit 207. The image signal generating unit 200, the high luminance detecting unit 204, the black level correcting unit 205, the correction parameter determining unit 206, and the learning unit 207 may be realized by circuits corresponding to each.

The image signal generating unit 200 includes a pixel area 201 and an AD conversion unit 202. In the pixel area 201, a plurality of pixels (unit pixels) including the photodiode are arranged in a matrix. Each pixel is drive-controlled by a predetermined pixel control circuit. Each pixel converts the incident light into an electric signal and outputs the pixel signal. The AD conversion unit 202 converts the analog pixel signals outputted from the pixel area 201 into digital signals. For example, the AD conversion unit 202 has a plurality of AD converters corresponding to each column of the pixel area 201, and converts the analog pixel signals from the pixel area 201 into the digital signals in parallel in row units. The AD-converted digital pixel signals are outputted to the memory 203.

The memory 203 temporarily stores the digital image signals outputted by the AD conversion unit 202. The memory 203 is realized by, for example, a RAM or the like. Image signals of a plurality of frames can be stored in the memory 203. The high luminance detecting unit 204 detects the position and the luminance of a subject with a predetermined luminance or higher (a high luminance subject) from the image signals temporarily stored in the memory 203. The high luminance subject is, for example, the sun. The predetermined luminance can be set to any luminance. For example, the predetermined luminance may be set to a saturated luminance (a luminance in a saturated state). In each embodiment, the high luminance detecting unit 204 detects the position and the luminance of the high luminance subject by using a machine-learned learning model (a learned model). The controller 104 also inputs photographing condition information such as an exposure time, an aperture value of the photographing lens, etc. into the high luminance detecting unit 204.

The black level correcting unit 205 obtains the image signals temporarily stored in the memory 203, and performs a correction (a black level correction) based on the image signals in an OB pixel area so that a black level becomes a predetermined reference value. The black level-corrected image signals are sequentially outputted to the outside of the image pickup element 100. For example, the black level-corrected image signals may be displayed on the display unit 106 and may be recorded in the recording unit 107. The correction parameter determining unit 206 determines a correction parameter of the black level correcting unit 205 according to a detection result of the high luminance detecting unit 204. The correction parameter includes an area for obtaining a correction value (hereinafter, referred to as "a correction value obtaining area"), a feedback gain, etc. The learning unit 207 performs machine learning of a learning model that detects the position and luminance information of the high luminance subject from the image signals temporarily stored in the memory 203.

Figure 3:
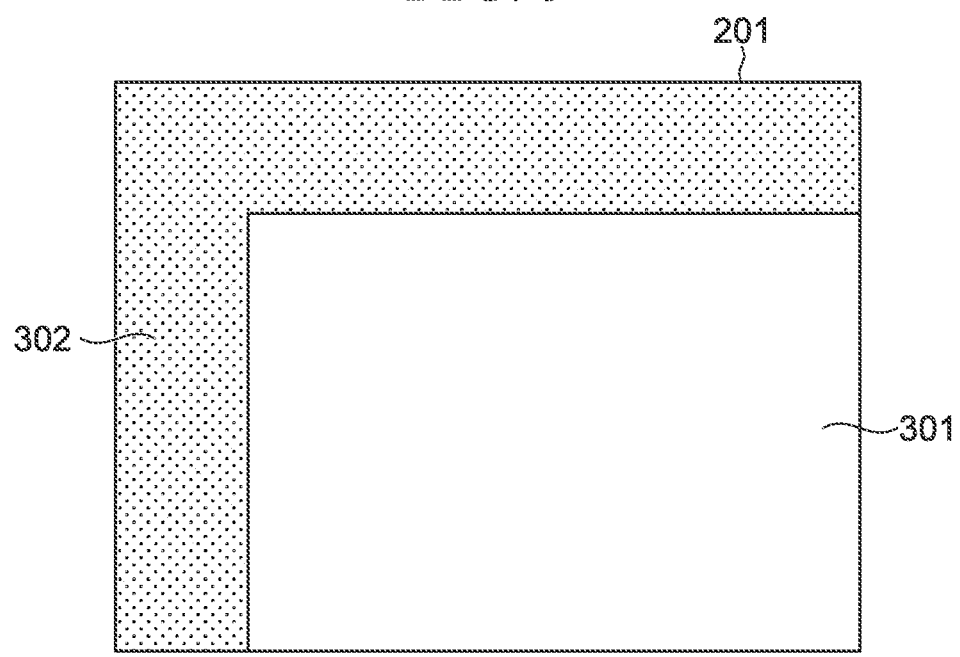
FIG. 3 is a diagram that shows an example of a pixel area.

FIG. 3 is a diagram that shows an example of the pixel area 201. The pixel area 201 includes an aperture pixel area 301 and an OB pixel area 302 (an area of optical black pixels). The OB pixel area 302 is provided on the outer peripheral side of the aperture pixel area 301. The aperture pixel area 301 is an area, in which aperture pixels that receive a subject image are arranged. In the pixels included in the OB pixel area 302, the photodiode is optically shielded from light by an aluminum film or the like. The pixel signals of the OB pixel area 302 are used when obtaining the correction value of the black level correcting unit 205.

Figure 4:
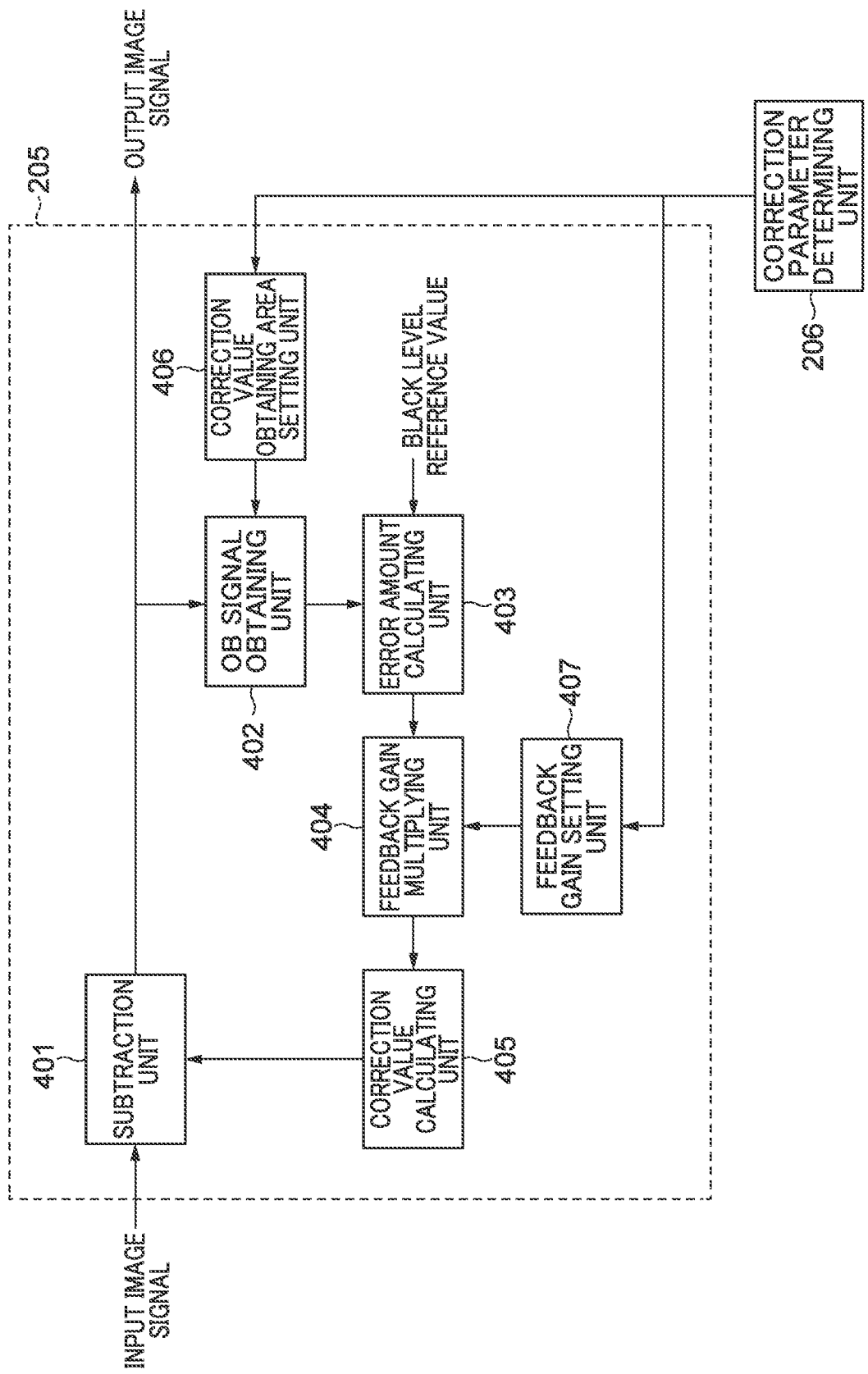
FIG. 4 is a diagram that shows an example of a black level correcting unit.

FIG. 4 is a diagram that shows an example of the black level correcting unit 205. The black level correcting unit 205 includes a subtraction unit 401, an OB signal obtaining unit 402, an error amount calculating unit 403, a feedback gain multiplying unit 404, a correction value calculating unit 405, a correction value obtaining area setting unit 406, and a feedback gain setting unit 407. The black level correcting unit 205 performs the black level correction with respect to the image signals. The black level correction may be a dark level correction. The image signals temporarily stored in the memory 203 (input image signals) are sequentially inputted into the black level correcting unit 205.

The subtraction unit 401 subtracts a black level correction value calculated by the correction value calculating unit 405 from the pixel signal of the image signal inputted from the black level correcting unit 205. The OB signal obtaining unit 402 obtains the pixel signals of the OB pixel area 302 among the image signals, on which the subtraction processing performed by the subtraction unit 401 is applied, and outputs the obtained pixel signals to the error amount calculating unit 403. At a timing when the pixel signals of the OB pixels set by the correction value obtaining area setting unit 406 among the pixel signals of the OB pixel area 302, on which the processing of the subtraction unit 401 is applied, are inputted, the OB signal obtaining unit 402 obtains the pixel signals of the said pixels. The area for obtaining the OB pixels set by the correction value obtaining area setting unit 406 is determined by the correction parameter determining unit 206. The OB signal obtaining unit 402 may output the average value of a plurality of OB pixels to the error amount calculating unit 403.

The error amount calculating unit 403 calculates a difference between a preset target value of the black level (a black level reference value) and an output level of the current OB pixel, which is outputted by the OB signal obtaining unit 402, as an error amount. The feedback gain multiplying unit 404 multiplies the error amount, which is calculated by the error amount calculating unit 403, by the feedback gain (a following time constant of the black level correction processing). It is preferable that the feedback gain multiplying unit 404 set the feedback gain to a value smaller than "1" so that the black level correction does not become an excessive correction. The feedback gain setting unit 407 selects one feedback gain from a plurality of preset feedback gains and outputs the selected feedback gain to the feedback gain multiplying unit 404. The selection of the feedback gain is determined by the correction parameter determining unit 206.

The correction value calculating unit 405 calculates the black level correction value by averaging calculation results sequentially outputted from the feedback gain multiplying unit 404. As described above, the subtraction unit 401 subtracts the black level correction value calculated by the correction value calculating unit 405 from the pixel signal of the image signal inputted into the black level correcting unit 205. By the subtraction unit 401 subtracting the black level correction value, the black level correction processing is performed with respect to the image signal. The black level-corrected image signals are outputted from the black level correcting unit 205 as output image signals. By repeating the above black level correction processing, the error amount between the signal level of the OB pixel and the black level reference value is gradually reduced, and finally converges so that the output of the OB pixel of the correction result and the black level reference value match. Since the correction value based on the OB signal is not generated for the pixel signal first inputted into the subtraction unit 401, the subtraction processing is performed with a predetermined correction value.

Figure 5:
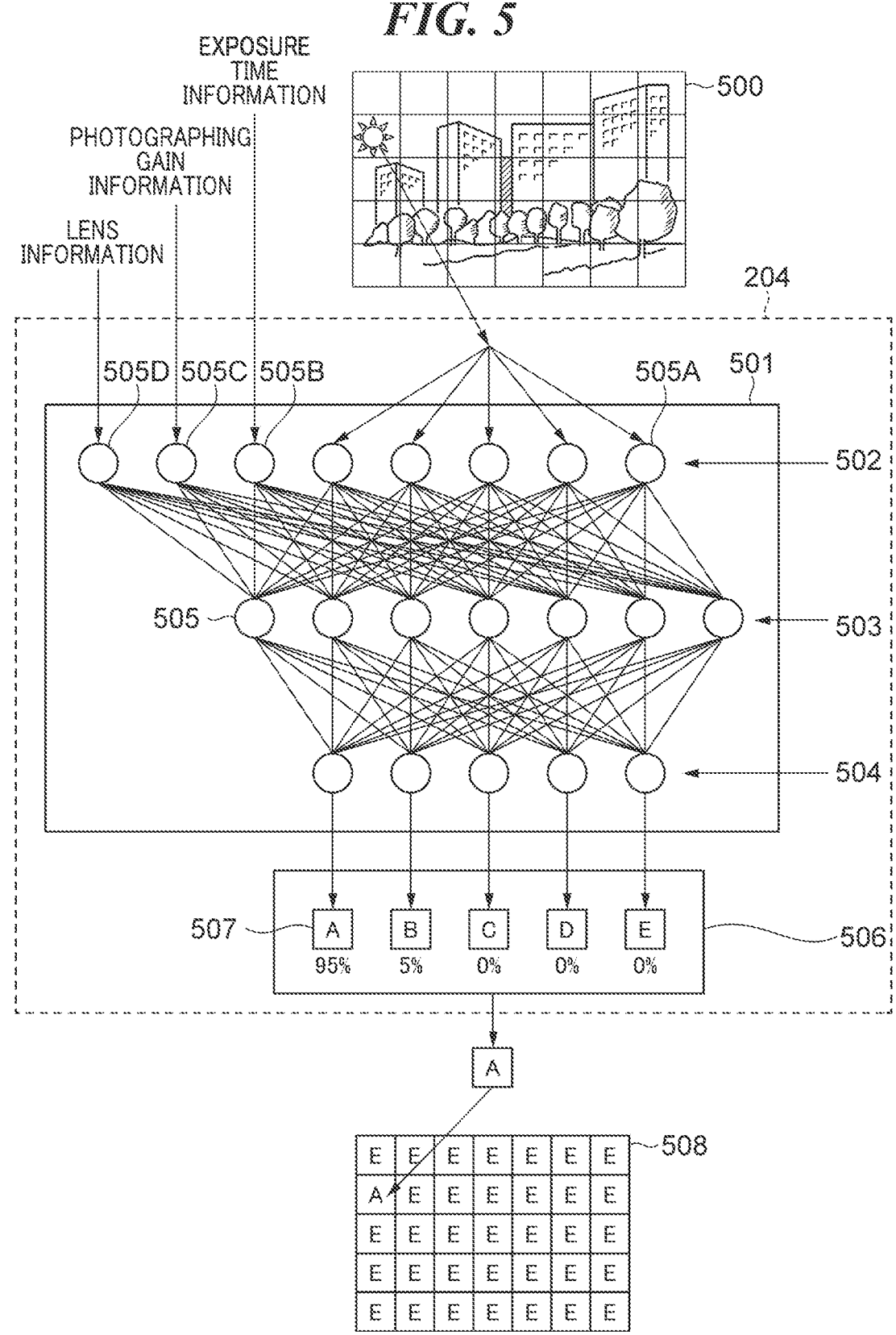
FIG. 5 is a diagram that shows an example of a high luminance detecting processing using a learning model.

FIG. 5 is a diagram that shows an example of a high luminance detecting processing using a learning model. The high luminance detecting unit 204 includes a learning model 501 and a judging unit 506. The learning model 501 may have the function of the judging unit 506. The learning model 501 of FIG. 5 shows an example of a model using a CNN (a convolutional neural network). The learning model 501 adopts three multi-layered structures of an input layer 502, an intermediate layer 503, and an output layer 504. Although the example of FIG. 5 shows an example, in which the intermediate layer 503 is one layer, one multi-layered structure can be adopted for the intermediate layer 503.

The input layer 502, the intermediate layer 503, and the output layer 504 include a plurality of nodes 505 for detecting whether or not the high luminance subject is included in the input image signals and for detecting a luminance level of the high luminance subject. Each node of the input layer 502 is connected to all the nodes of the intermediate layer 503, respectively. Further, each node of the intermediate layer 503 is connected to all the nodes of the output layer 504, respectively. As described above, the learning model 501 adopts a neural network structure, in which each node 505 is connected.

As shown in the example of FIG. 5, image signals 500 corresponding to the aperture pixel area 301 among the image signals temporarily stored in the memory 203 are inputted into a plurality of nodes 505A among the nodes of the input layer 502 as the input image signals. The image signals 500 are divided into predetermined areas. Each area of the image signals 500 is sequentially inputted into each node 505A. The input layer 502 further includes a node 505B, a node 505C, and a node 505D. Three pieces of photographing condition information of exposure time information, photographing gain information, and lens information, are inputted from the controller 104 into the node 505B, the node 505C, and the node 505D, respectively. The photographing condition information regarding photographing conditions is not limited to the three pieces of information of FIG. 5.

The exposure time information is information that represents the exposure time when the image signals temporarily stored in the memory 203 are photographed. The photographing gain information is information that represents an amplification ratio when the image signals are amplified by the image signal generating unit 200 in the case that the image signals are photographed. The lens information is information that represents the aperture value, a focal length, etc. of the photographing lens 102 in the case that the image signals are photographed.

The outputs from respective nodes 505A to 505D of the input layer 502 propagate through the intermediate layer 503 and finally to the output layer 504. Each node in the input layer 502, the intermediate layer 503, and the output layer 504 is weighted so as to appropriately output likelihoods of whether the high luminance subject is included and which luminance level it corresponds to on the basis of the area of the image signals 500 and the photographing condition information. The weight of each node is adjusted by the machine learning that will be described later. Each node is adjusted so that based on the inputted information, the weight increases as a possibility (the likelihood) that the area of the image signals 500 inputted is the corresponding luminance level among multiple levels of luminance increases.

In the example of FIG. 5, the luminance level of the high luminance subject, which is equal to or higher than a saturation level, is represented in five levels. A luminance level A is the high luminance subject having the highest luminance level, and the luminance level of the high luminance subject decreases in the order of a luminance level B, a luminance level C, and a luminance level D. Further, a luminance level E indicates that the subject is not a high luminance subject. In the input image signals, all the pixel signals of the area where the subject corresponding to the luminance level A, the luminance level B, the luminance level C, or the luminance level D exists have the saturation level. In the example of FIG. 5, when one area of the image signals 500 is inputted into the learning model 501, a result is obtained that the possibility (the likelihood) that the luminance level of the high luminance subject is "A" is "95%" and the possibility (the likelihood) that the luminance level of the high luminance subject is "B" is "5%".

Based on numerical values of the luminance levels A to E outputted from the output layer 504, the judging unit 506 judges whether or not the area of the image signals 500 inputted includes a high luminance subject, and in the case that the subject is a high luminance subject, the judging unit 506 also judges the luminance level of the high luminance subject. As described above, the image signals inputted into the learning model 501 are divided into a plurality of areas. Further, the above processing based on the learning model 501 (hereinafter, referred to as "an inference processing") is performed with respect to each of the divided plurality of areas. The area of the image signals 500 to be inputted into the learning model 501 is specified. Further, by the inference processing based on the learning model 501, whether or not a high luminance subject is included, and the luminance level of the high luminance subject in the case that the subject is a high luminance subject are inferred. Therefore, the detection result that indicates at which position of the aperture pixel area 301 the high luminance subject is located and indicates the luminance level of the high luminance subject (high luminance detection result information 508) can be obtained. In the example of FIG. 5, it is detected that one area of the image signals 500 corresponding to the aperture pixel area 301 is a high luminance subject having the luminance level A, and other areas are not a high luminance subject. The high luminance detection result information 508 is outputted to the correction parameter determining unit 206.

The above learning model 501 is machine-learned in advance in order to infer that a high luminance subject whose image signals are saturated is a high luminance subject of what luminance level. The details of a method of the machine learning will be described later. Although the example of FIG. 5 shows an example, in which the luminance level of a high luminance subject is inferred, another index may be used for the brightness of the high luminance subject. Further, for example, inference based on the learning model 501 may be performed with respect to areas within a certain range predetermined based on the OB pixel area 302, instead of all areas of the image signals 500 corresponding to the aperture pixel area 301.

The high luminance detecting unit 204 may infer the position and the luminance of the high luminance subject from the image signals 500 corresponding to the aperture pixel area 301 by using a learning model, which is machine-learned by using any machine learning algorithm other than CNN. For example, the high luminance detecting unit 204 may infer the position and the luminance of the high luminance subject by using a learning model, which is machine-learned by using any machine learning algorithm such as support vector machine or logistics regression.

Further, the high luminance detecting unit 204 may detect the position and the luminance level of the high luminance subject by using a method other than the learning model. For example, the high luminance detecting unit 204 may detect the position and the luminance level of the high luminance subject based on the luminance value of each pixel of the image signals. Moreover, the high luminance detecting unit 204 may specify an area including the pixel signals having the saturation level in the input image signals as the position of the high luminance subject, and may set only the luminance level of the high luminance subject in the specified area as the target of the inference that uses the learning model 501.

Figure 6:
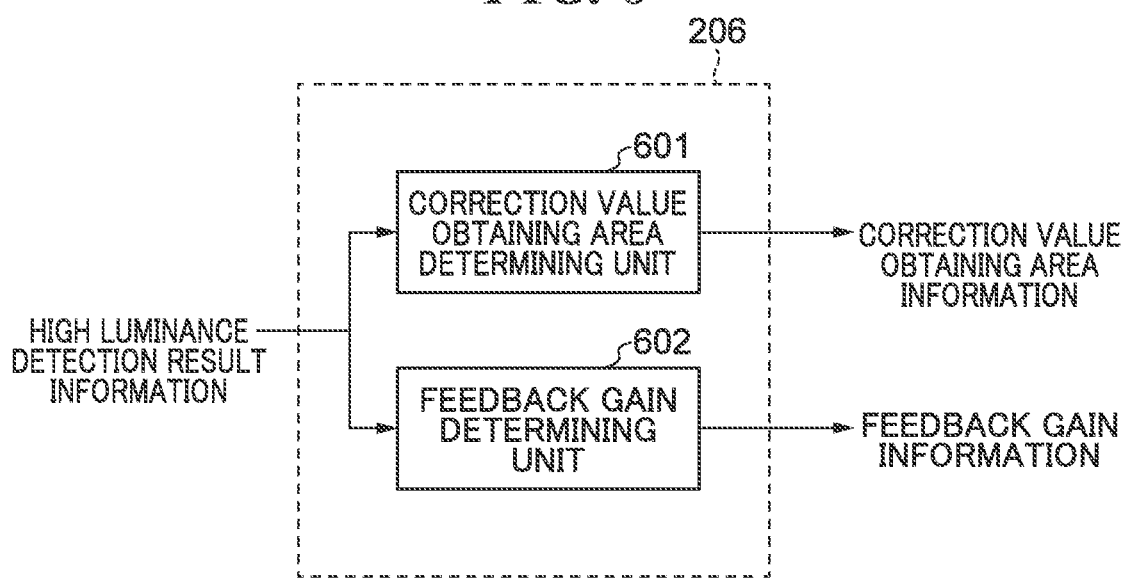
FIG. 6 is a diagram that shows an example of a correction parameter determining unit.

FIG. 6 is a diagram that shows an example of the correction parameter determining unit 206. The correction parameter determining unit 206 includes a correction value obtaining area determining unit 601 and a feedback gain determining unit 602. The correction value obtaining area determining unit 601 determines the area for obtaining the correction value from the OB pixel area 302 in the black level correcting unit 205 based on the high luminance detection result information obtained from the high luminance detecting unit 204. The correction value obtaining area determining unit 601 outputs the determined correction value obtaining area as correction value obtaining area information to the correction value obtaining area setting unit 406 of the black level correcting unit 205.

Figure 7:
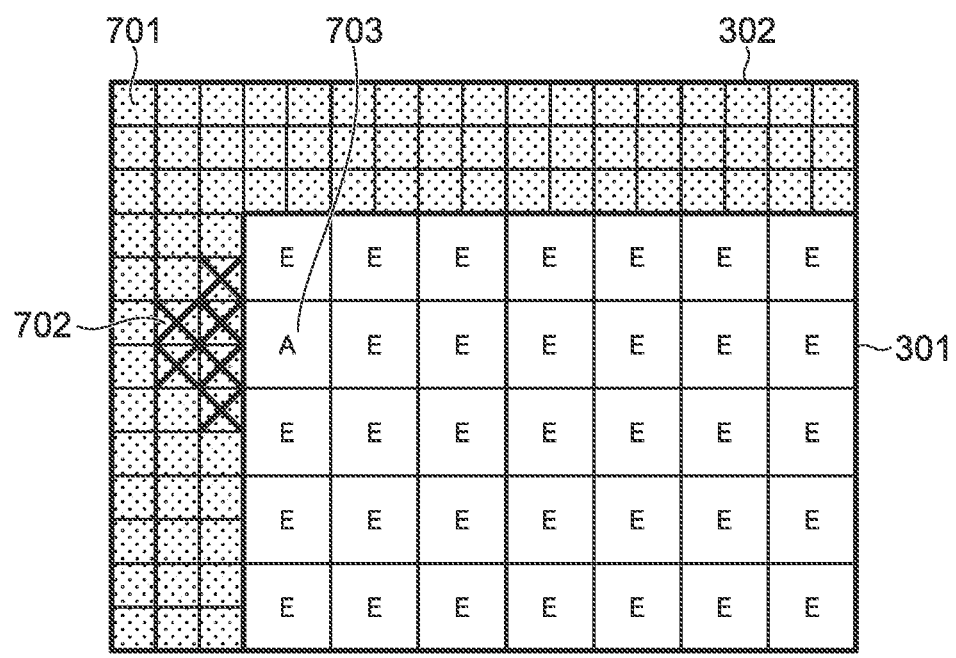
FIG. 7 is a diagram that shows an example of a correction value obtaining area.

FIG. 7 is a diagram that shows an example of the correction value obtaining area. In the aperture pixel area 301, respective luminance levels of respective areas are shown as the high luminance detection result information. The OB pixel area 302 is divided into a plurality of areas. A usage area 701 is an area used for obtaining the correction value, and a non-usage area 702 is an area not used for obtaining the correction value. For example, it is assumed that a high luminance subject is detected in an area 703 among respective areas of the image signals corresponding to the aperture pixel area 301. In this case, the OB pixel area in the vicinity of the area 703 (an area within a predetermined range from the high luminance subject) is set as an area excluded from the area for obtaining the correction value.

Here, as the luminance level of the high luminance subject detected among respective areas of the image signals corresponding to the aperture pixel area 301 increases, the OB pixel area excluded from the correction value obtaining area is set to become wider. This enhances the effect of reducing the influence of the light leakage. On the other hand, in the case that the luminance level of the high luminance subject is low, the OB pixels in a wide range can be used for the black level correction. Therefore, it is possible to suppress the influence of noises, etc. included in the image signals and perform the black level correction with good accuracy.

The feedback gain determining unit 602 of FIG. 6 determines a feedback gain amount used in the feedback gain multiplying unit 404 of the black level correcting unit 205 based on the high luminance detection result information obtained from the high luminance detecting unit 204. The determined feedback gain amount is outputted to the feedback gain setting unit 407 of the black level correcting unit 205 as feedback gain information.

Figure 8:
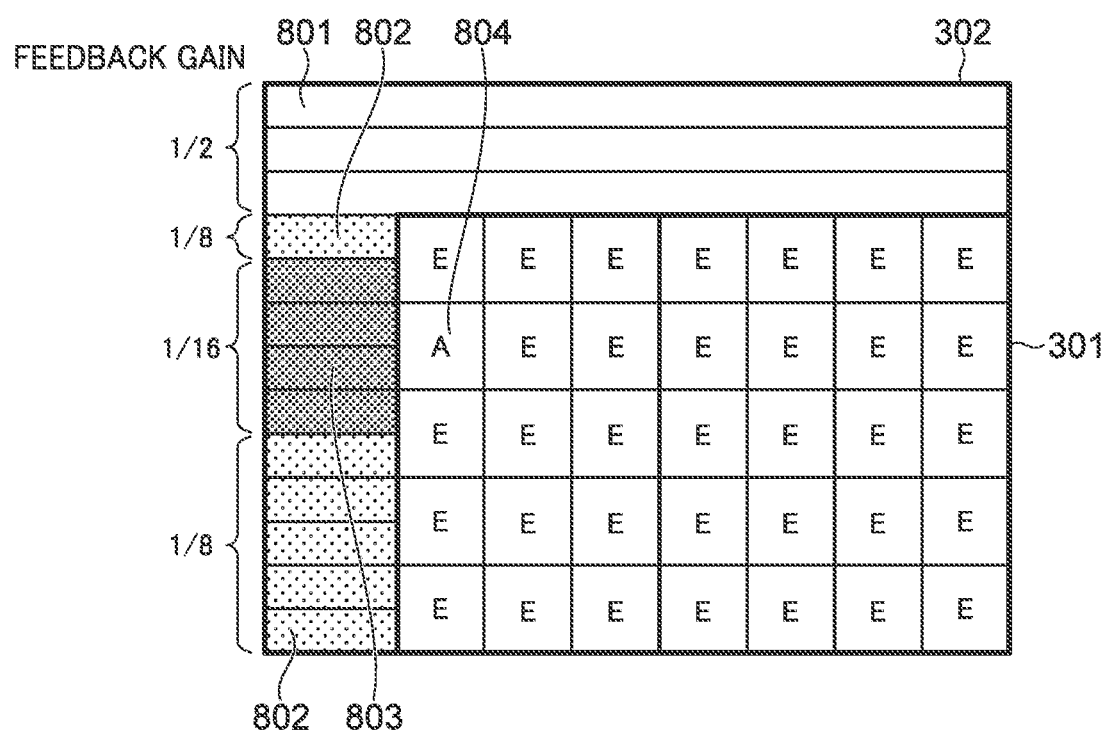
FIG. 8 is a diagram that shows an example of setting of a feedback gain.

FIG. 8 is a diagram that shows an example of setting of the feedback gain. In the example of FIG. 8, the feedback gain is changed in row units. In an area 801 among the OB pixel area 302, the feedback gain is set to "½" in order to draw a large amount of the dark current first in the black level correction. In an area 802, the feedback gain is set to "⅛". As a result, the black level can be adjusted by gently following the change in the dark current within the pixel area. In an area 803 in the vicinity of an area 804 of the aperture pixel area 301, in which the high luminance subject is detected, the feedback gain is set to "1/16".

The area 803 is also an area, in which the number of the OB pixels used by the correction value obtaining area determining unit 601 for obtaining the correction value is small. In the case that the number of the OB pixels used for obtaining the correction value is small, sometimes an error occurs in the black level correction due to the influence of the noises, etc. included in the image signals, and noises in a lateral streak shape occur in the area of the aperture pixel area 301. Therefore, by the feedback gain determining unit 602 setting the feedback gain of the area 803 to be low, it is possible to reduce the occurrence of the noises in the lateral streak shape. That is, with respect to the area, the smaller the number of the OB pixels used for obtaining the correction value, the lower the feedback gain is set. As described above, the correction parameter of the black level correcting unit 205 is changed according to the high luminance detection result of the high luminance detecting unit 204. As a result, it is possible to suppress the influence of the high luminance light and suitably correct the black level.

Figure 9:
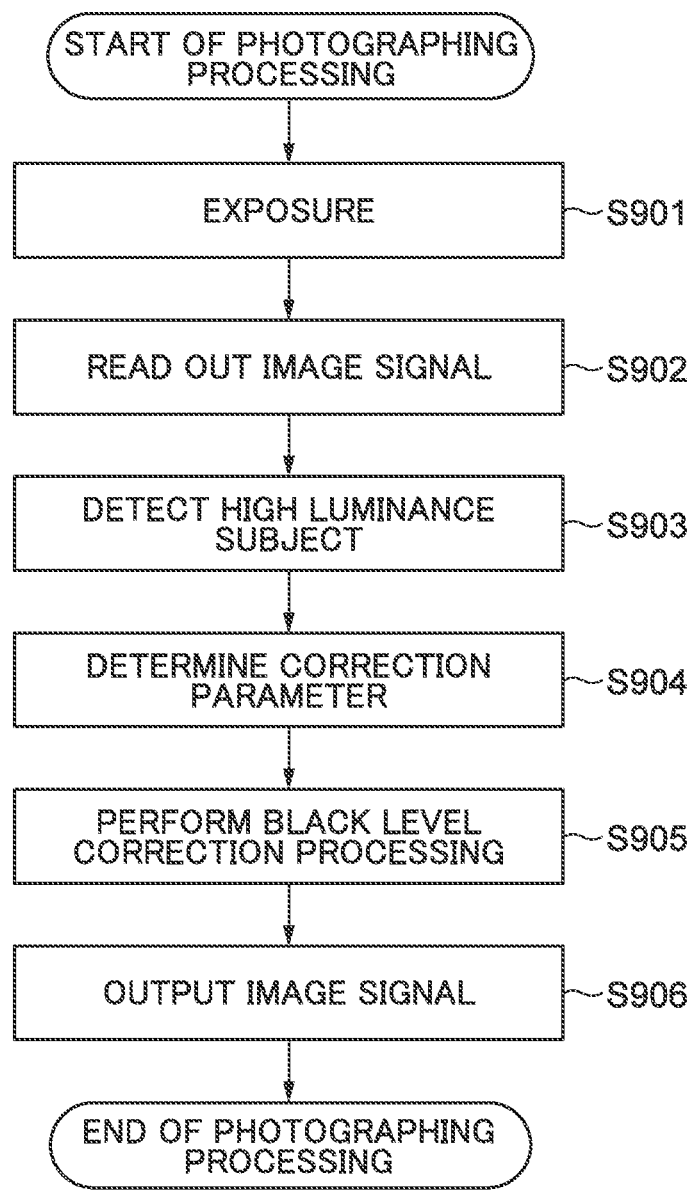
FIG. 9 is a flowchart that shows an example of the flow of a photographing processing of the first embodiment.

FIG. 9 is a flowchart that shows an example of the flow of a photographing processing of the first embodiment. Each process of the flowchart of FIG. 9 is started, for example, after a photographing instruction is given. As shown in FIG. 9, in a step S901, when a control signal is outputted from the controller 104 to the image pickup element 100, exposure is started in the image pickup element 100. When the exposure is started, signals are accumulated in respective pixels of the pixel area 201 of the image pickup element 100. After the exposure is completed, in a step S902, the image signals are read out to the AD conversion unit 202. At this time, signals of the respective pixels of the pixel area 201 are sequentially read out to the AD conversion unit 202, and the AD conversion unit 202 converts the signals of the respective pixels into digital pixel signals. The digital pixel signals obtained by the AD conversion are temporarily stored in the memory 203 as image signals.

In a step S903, the high luminance detecting unit 204 obtains the image signals temporarily stored in the memory 203, and detects a high luminance subject from the obtained image signals. As a result, the high luminance detection result information that indicates the position and the luminance level of the high luminance subject can be obtained. The high luminance detection result information is outputted to the correction parameter determining unit 206. In a step S904, the correction parameter determining unit 206 determines the correction parameter of the correction value obtaining area and the correction parameter of the feedback gain based on the obtained high luminance detection result information. The correction parameter determining unit 206 outputs information about the determined correction value obtaining area and the determined feedback gain to the black level correcting unit 205.

In a step S905, the black level correcting unit 205 performs the black level correction processing with respect to the image signals temporarily stored in the memory 203 based on the correction value obtaining area information and the feedback gain information, which are obtained from the correction parameter determining unit 206. In a step S906, the black level correcting unit 205 outputs the image signals, with respect to which the black level correction processing is performed, to the controller 104 via the signal processing unit 101. The controller 104 outputs the obtained image signals to the display unit 106, the recording unit 107, etc. The display unit 106 displays the image signals received from the controller 104 as a photographed image. Further, the recording unit 107 records the image signals received from the controller 104 in a semiconductor memory or the like.

Figure 10:
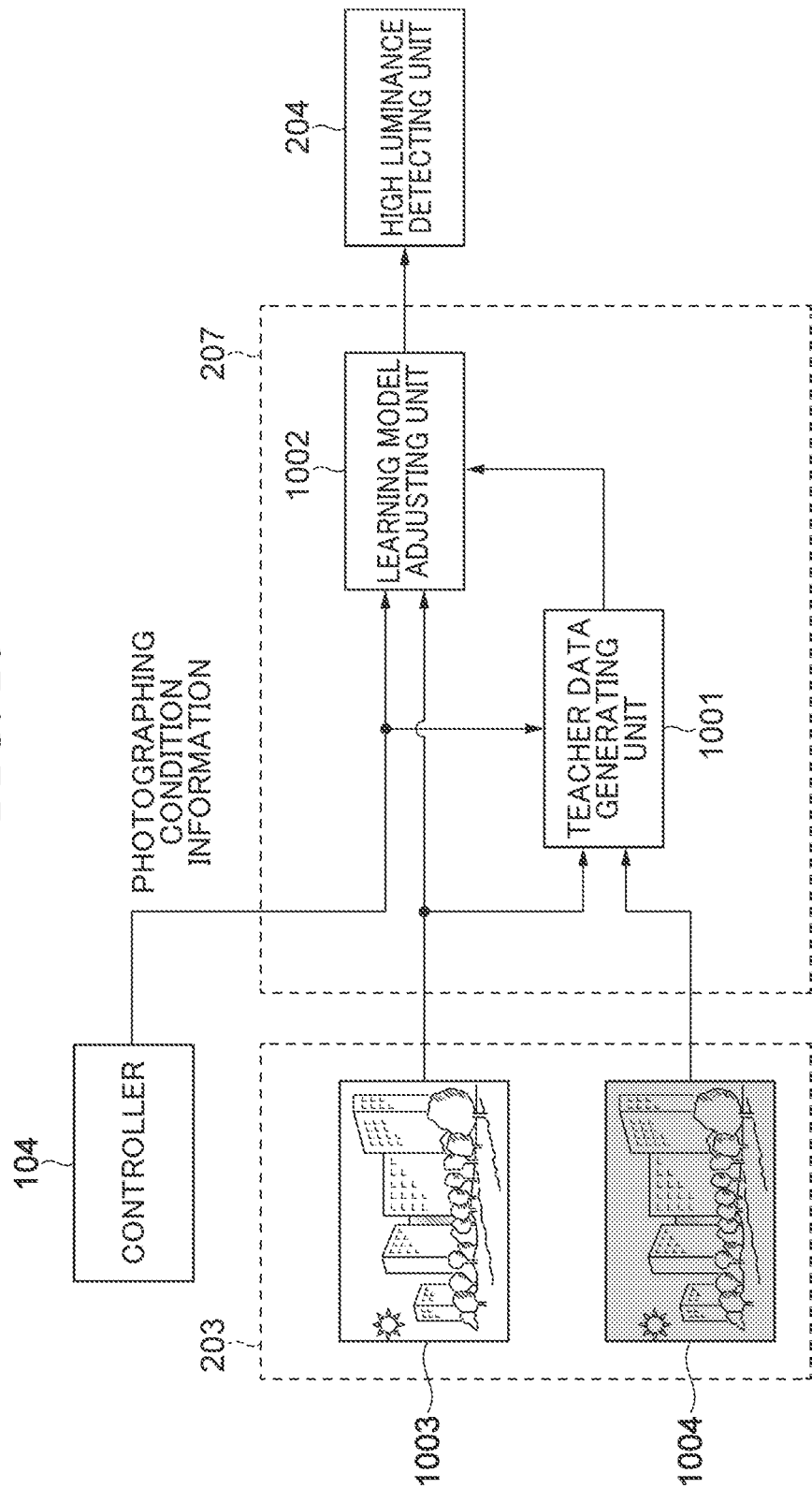
FIG. 10 is a diagram that shows an example of a learning unit according to the first embodiment.

Next, the machine learning of the learning model will be described. FIG. 10 is a diagram that shows an example of the learning unit 207 according to the first embodiment. The learning unit 207 includes a teacher data generating unit 1001 and a learning model adjusting unit 1002. Image signals 1003 and 1004 of at least two images including a high luminance subject are inputted into the learning unit 207 as data for learning from the memory 203. Although the image signals 1003 and the image signals 1004 are image signals obtained by photographing the same scene, their exposure conditions at the time of photographing are different from each other. The image signals 1003 (first image signals) are image signals obtained by photographing under a proper exposure condition. Further, the image signals 1004 (second image signals) are image signals obtained by photographing under an underexposure condition.

The image signals 1004 are the image signals obtained by photographing the same scene as the image signals 1003, and is a darker image than the image signals 1003. That is, the image of the image signals 1004 is an image, in which the image signals 1003 are darkened. Further, the photographing condition information (the lens information, the photographing gain information, and the exposure time information) of the image signals 1003 and the image signals 1004 is inputted into the learning unit 207 from the controller 104.

The image signals 1003 and the image signals 1004, which include the high luminance subject, are inputted from the memory 203 to the teacher data generating unit 1001. Further, the photographing condition information (the lens information, the photographing gain information, and the exposure time information), which indicates the photographing conditions when photographing the image signals 1003 and the image signals 1004, is inputted into the teacher data generating unit 1001 from the controller 104. The teacher data generating unit 1001 detects the position of the high luminance subject from at least one of the image signals 1003 and the image signals 1004, which are inputted from the memory 203.

Further, it is possible to calculate a rough luminance level of the high luminance subject based on the above-mentioned photographing condition information and the output level from the position of the high luminance subject in the image signals 1004 obtained by photographing under the underexposure condition. The teacher data generating unit 1001 generates the position and the luminance level of the high luminance subject as teacher data (correct answer data) based on a comparison result between the image signals 1003 and the image signals 1004, and the photographing condition information of the image signals 1003 and the image signals 1004.

The learning model adjusting unit 1002 adjusts the weight of each node of the CNN (the learning model 501). The image signals 1003 as the data for learning are inputted into the learning model adjusting unit 1002. Further, as the data for learning, the photographing condition information (the lens information, the photographing gain information, and the exposure time information) when photographing the image signals 1003 is inputted into the learning model adjusting unit 1002. The learning model adjusting unit 1002 adjusts the weight of each node of the CNN so that an error between the output when the image signals 1003 and its photographing condition information are inputted, and the teacher data (the position and the luminance level of the high luminance subject) becomes small.

As a result, when unknown image signals are inputted, the CNN as the learning model 501 can infer the position and the luminance level of the high luminance subject in the unknown image signals with high accuracy. Further, the image signals 1003, which are used by the learning model adjusting unit 1002 for the machine learning, also include a case where the luminance level of the high luminance subject becomes the saturated state. As a result, even in the case that unknown image signals, in which the luminance level of the high luminance subject is the saturated state, are inputted into the CNN, the CNN can infer the position and the luminance level of the high luminance subject with high accuracy. Moreover, as described above, since it is possible to detect the position of a high luminance subject without using a learning model, the CNN may be a learning model, in which only the luminance level of the high luminance subject is the target of the inference.

Figure 11:
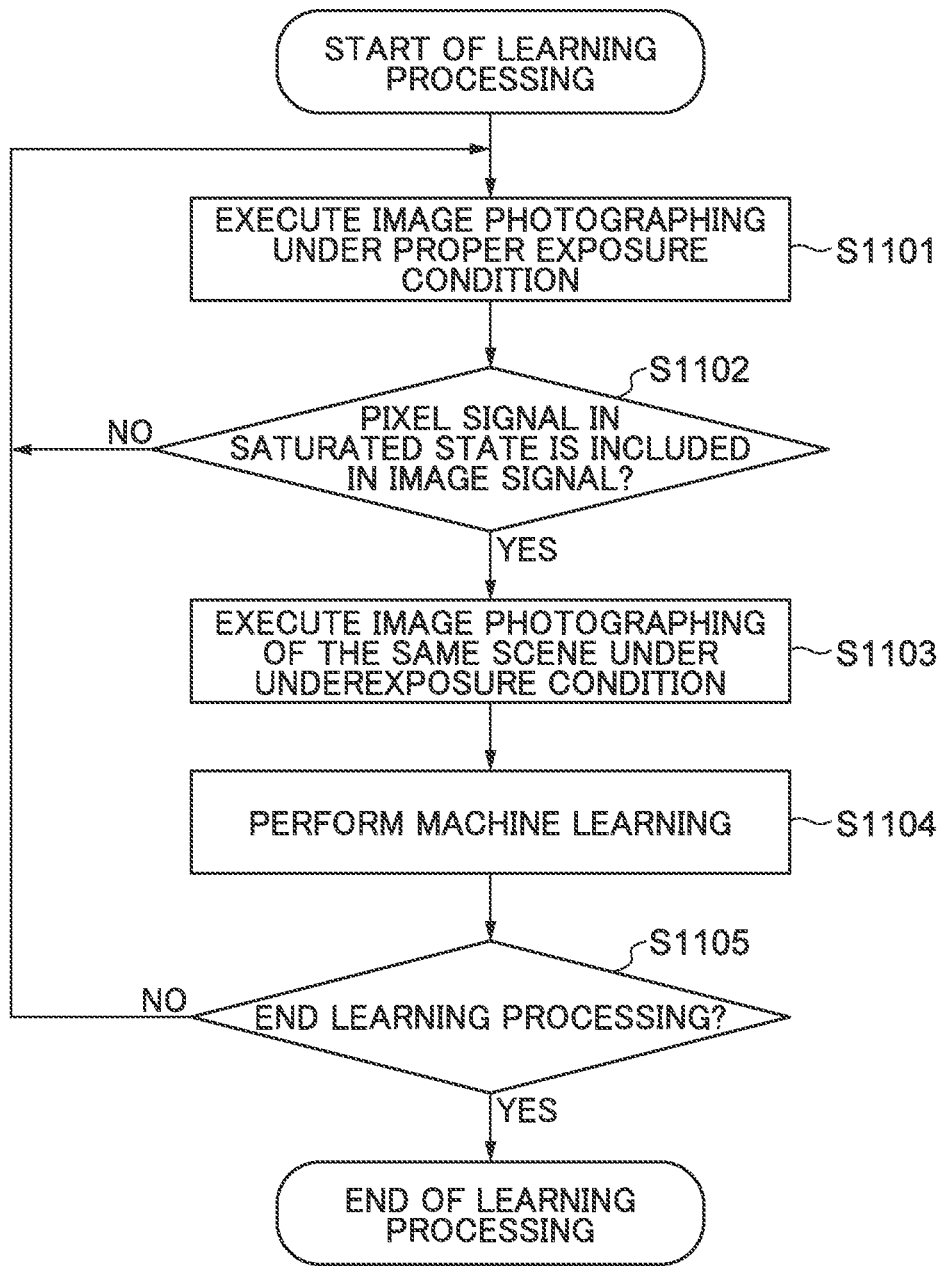
FIG. 11 is a flowchart that shows an example of the flow of a learning processing.

FIG. 11 is a flowchart that shows an example of the flow of a learning processing. Each process of the flowchart of FIG. 11 is started, for example, based on an instruction from the user. The controller 104 may cause the display unit 106 to display information, which indicates that it is a mode that performs the learning processing, and a message to prompt photographing set to proper exposure (i.e., a message to prompt photographing under the proper exposure condition). As shown in FIG. 11, in a step S1101, the controller 104 performs a control, which executes the photographing under the proper exposure condition, based on the photographing instruction by the user. When the user uses the operating unit 108 to set the setting of the image pickup apparatus 10 to the proper exposure and instruct photographing, the photographing under the proper exposure condition is executed. The controller 104 temporarily stores the image signals, which are generated by the image signal generating unit 200, in the memory 203.

In a step S1102, the high luminance detecting unit 204 judges whether or not the pixel signals in the saturated state are included in the image signals temporarily stored in the memory 203. In the case of judging that the pixel signals in the saturated state are not included in the image signals temporarily stored in the memory 203 (NO in the step S1102), the high luminance detecting unit 204 returns the processing to the step S1101. In this case, the image signals obtained by the photographing in the step S1101 are not used for the machine learning performed by the learning unit 207. Therefore, the controller 104 may display, for example, a screen, which prompts photographing of a scene including a high luminance subject, on the display unit 106.

In the case of judging that the pixel signals in the saturated state are included in the image signals temporarily stored in the memory 203 (YES in the step S1102), the high luminance detecting unit 204 advances the processing to a step S1103. In the step S1103, the controller 104 performs a control, which executes the photographing of the same scene under the underexposure condition, based on the photographing instruction from the user. At this time, the controller 104 may display a screen, which prompts the change of the photographing conditions such as the photographing gain, the exposure time, and the aperture value of the photographing lens, on the display unit 106. In this case, the user uses the operating unit 108 to change the exposure condition so that the exposure condition becomes the underexposure condition, and instruct photographing. As a result, the photographing under the underexposure condition is executed. The controller 104 temporarily stores the image signals, which are generated by the image signal generating unit 200, in the memory 203.

In a step S1104, the learning unit 207 uses the image signals temporarily stored in the memory 203 (the first image signals obtained by the photographing in the step S1101 and the second image signals obtained by the photographing in the step S1103) to perform the machine learning. In the case that the learning model 501 of the learning unit 207 is a CNN, the weight of each node of the CNN is adjusted by the machine learning. As the method of the machine learning, an error back propagation method or the like can be applied. In the case that a composition of the first image signals obtained by the photographing in the step S1101 and a composition of the second image signals obtained by the photographing in the step S1103 are different, the machine learning is not performed properly. Therefore, in the case that the composition of the first image signals and the composition of the second image signals are different, the learning unit 207 may be controlled so as not to perform the machine learning.

In a step S1105, the controller 104 judges whether or not to end the learning processing. For example, in the case that the user inputted an instruction, which ends the learning processing, by using the operating unit 108, the controller 104 judges YES in the step S1105. In the case that the controller 104 judged YES in the step S1105, the controller 104 ends the processing of the flowchart of FIG. 11. On the other hand, in the case that the controller 104 judged NO in the step S1105, the controller 104 returns the processing to the step S1101. In this case, the processing, which newly photographs the image signals used for the machine learning, is started.

The high luminance detecting unit 204, the black level correcting unit 205, and the learning unit 207 that are described above may be provided, for example, in the controller 104 instead of the image pickup element 100. In this case, the controller 104 performs the learning processing and performs the black level correction. Further, in the above-mentioned example, the machine learning of the learning unit 207 is performed based on the instruction from the user and based on the image signals obtained by the photographing using the image pickup apparatus 10. In this respect, for example, the learning model, in which the above-mentioned machine learning is performed, may be set in the learning unit 207 in advance before the image pickup apparatus 10 is shipped. In this case, each process of the flowchart of FIG. 11 can be omitted.

Further, in the case that the image pickup apparatus 10 has a communication function, the learning model, in which the above-mentioned learning processing is executed, may be obtained from an external apparatus. The external apparatus uses the image signals obtained by the photographing under the proper exposure condition and the image signals obtained by the photographing under the underexposure condition to perform the machine learning of the step S1104 of FIG. 11. The image pickup apparatus 10 obtains the machine-learned learning model from the external apparatus via the communication function, and sets the obtained learning model in the learning unit 207. Also in this case, each process of the flowchart of FIG. 11 can be omitted.

According to the first embodiment, even in the case that the high luminance subject included in the image signals is in the saturated state, it is possible to detect the position and the luminance level of the high luminance subject with high accuracy. As a result, it becomes possible to suppress the influence of the high luminance light and appropriately perform the black level correction processing. The first embodiment can also be applied to a correction processing other than the black level correction processing, that is, the first embodiment can also be applied to a correction processing based on the image signals including a high luminance subject. The same applies to the following second embodiment and third embodiment.

Next, the second embodiment of the present invention will be described. The second embodiment is preferably applied to a live view photographing, a moving image photographing, etc., in which a continuous photographing is performed and the generated image signals are sequentially displayed on the display unit 106. In the second embodiment, the high luminance detecting unit 204 can select the image signals used for detecting a high luminance subject from the image signals, with respect to which the black level correction processing is performed, and the image signals, with respect to which the black level correction processing is not performed. The black level correcting unit 205 determines the correction parameter for the black level correction of the next frame based on the high luminance subject detected by the high luminance detecting unit 204. In the second embodiment, since it is possible to perform the signal processing such as detection of a high luminance subject with respect to the image signals after the black level correction, the influence of a decrease in a dynamic range due to the dark current during the signal processing is reduced.

Figure 12:
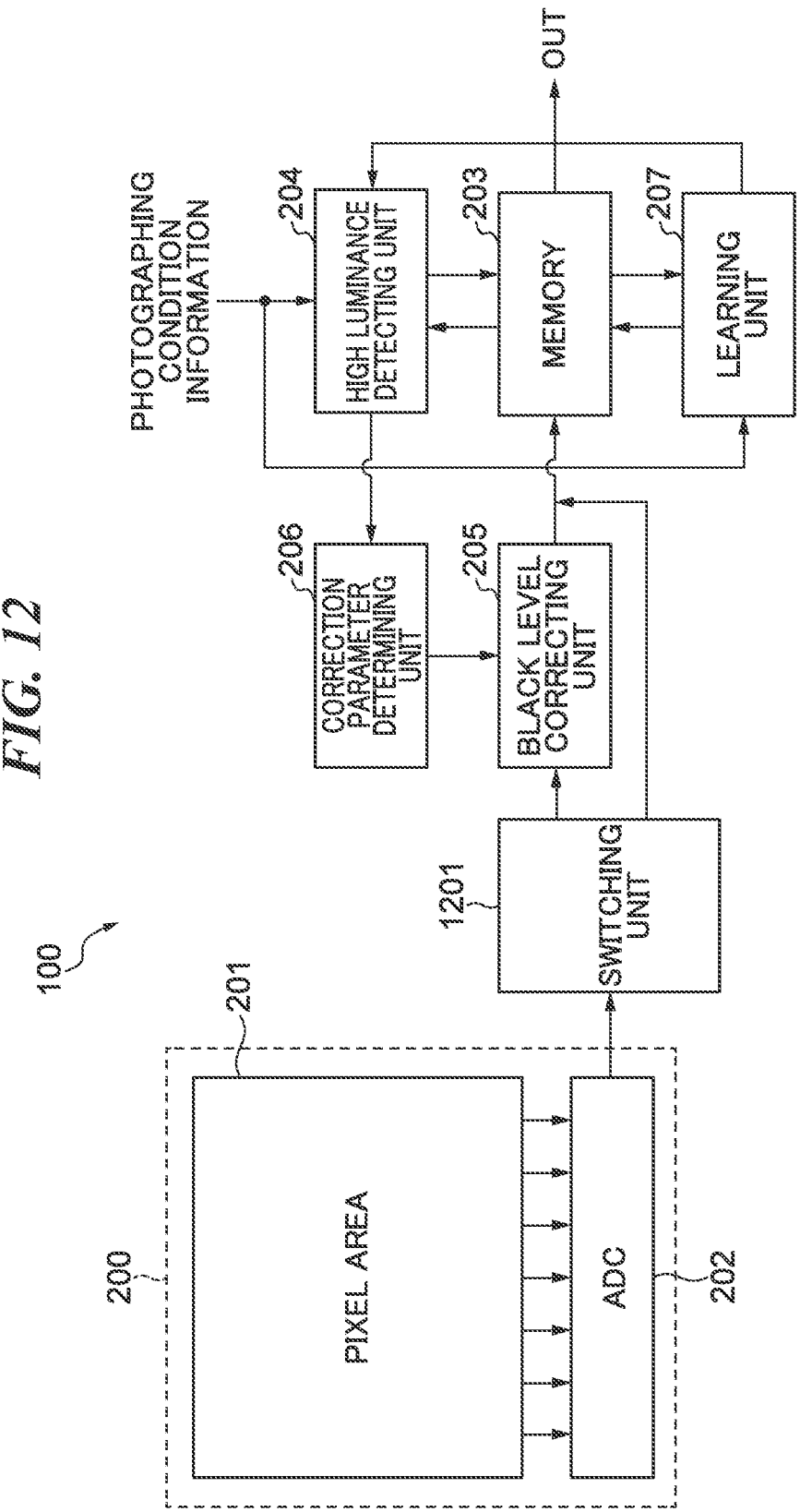
FIG. 12 is a diagram that shows an example of an image pickup element according to a second embodiment of the present invention.

FIG. 12 is a diagram that shows an example of an image pickup element 100 according to the second embodiment. Since the configurations other than a switching unit 1201 are the same as the configurations shown in FIG. 2, the description thereof will be omitted. The image signals AD-converted by the AD conversion unit 202 are inputted into the switching unit 1201. The switching unit 1201 switches an output destination of the inputted image signals to either the black level correcting unit 205 or the memory 203. The switching unit 1201 outputs the image signals to the black level correcting unit 205 during a normal photographing operation. The switching unit 1201 is realized by a circuit.

On the other hand, the switching unit 1201 outputs the image signals to the memory 203 when the learning unit 207 performs the machine learning of the learning model. At a stage where the machine learning of the learning model is performed, it is highly possible that the accuracy of detecting the position and the luminance level of the high luminance subject is not sufficient. Therefore, the image signals, with respect to which the black level correction is performed by using the correction parameter based on the position and the luminance level of the high luminance subject whose detection accuracy is not sufficient, are not suitable for the machine learning of the learning model. The switching unit 1201 outputs the image signals to the memory 203 when the machine learning of the learning model is performed. As a result, it is possible to prevent the inappropriate image signals from being used for the machine learning of the learning model.

As described above, the switching unit 1201 outputs the image signals to the black level correcting unit 205 during the normal photographing operation. As a result, the black level correcting unit 205 performs the black level correction with respect to the image signals, and outputs the image signals, with respect to which the black level correction is performed, to the memory 203. The memory 203 temporarily stores the image signals, with respect to which the black level correction is performed. Further, the high luminance detecting unit 204 reads out the image signals temporarily stored in the memory 203 and detects the position and the luminance level of the high luminance subject. Information about the position and the luminance level of the high luminance subject detected (the high luminance detection result information) is outputted to the correction parameter determining unit 206. The correction parameter determining unit 206 determines the correction parameter such as the correction value obtaining area and the feedback gain based on the high luminance detection result information. The black level correcting unit 205 performs the black level correction of the image signals of the next frame by using the determined correction parameter.

Figure 13:
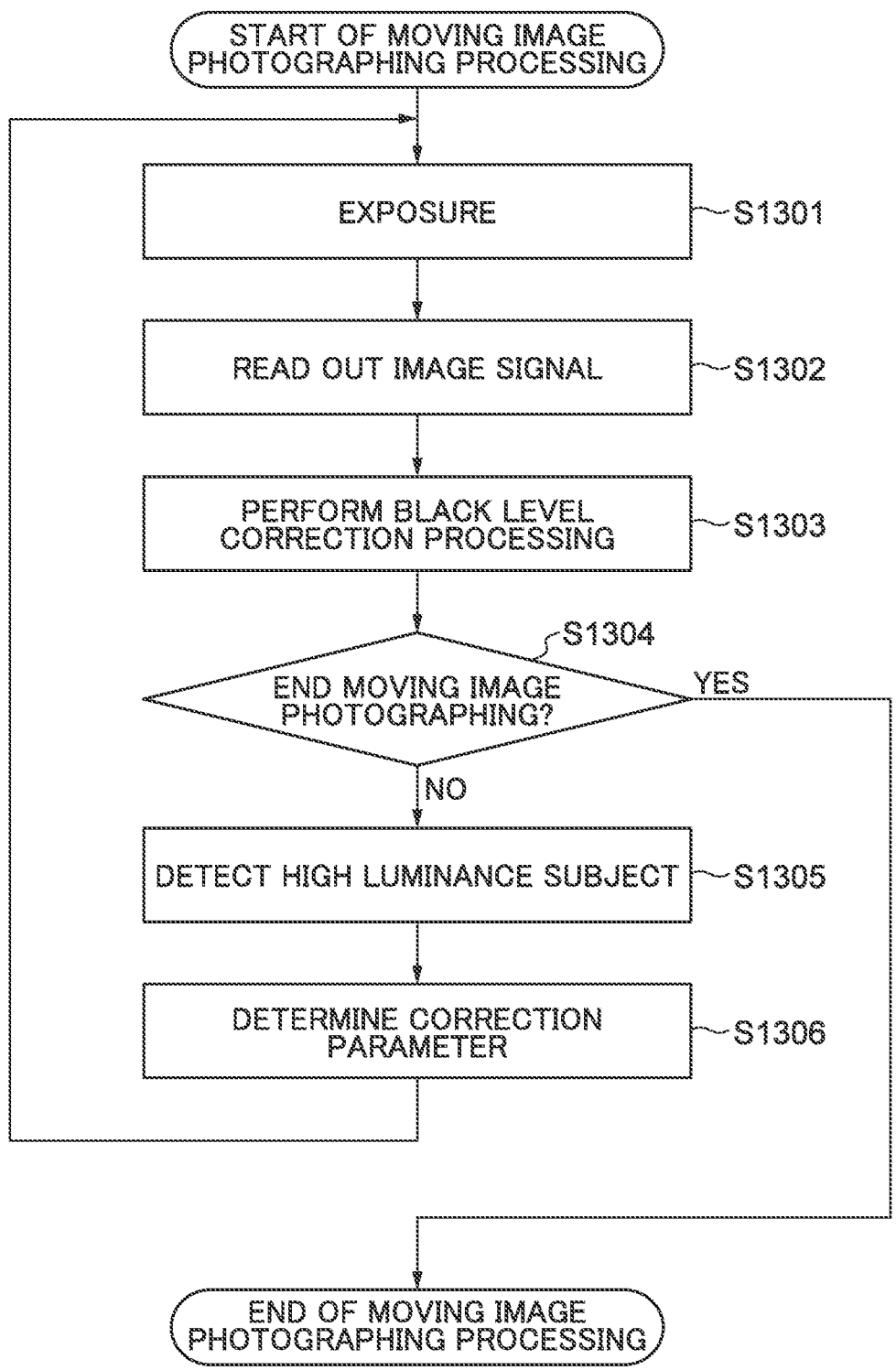
FIG. 13 is a flowchart that shows an example of the flow of a photographing processing of the second embodiment.

FIG. 13 is a flowchart that shows an example of the flow of a photographing processing of the second embodiment. Each process of the flowchart of FIG. 13 is started, for example, after a moving image photographing instruction is given. When each process of the flowchart of FIG. 13 is started, the switching unit 1201 sets the output destination of the inputted image signals to the black level correcting unit 205. On the other hand, when the learning processing shown in the flowchart of FIG. 11 is performed, the switching unit 1201 sets the output destination of the inputted image signals to the memory 203.

As shown in FIG. 13, in a step S1301, when a control signal is outputted from the controller 104 to the image pickup element 100, exposure is started in the image pickup element 100. When the exposure is started, signals are accumulated in respective pixels of the pixel area 201 of the image pickup element 100. After the exposure is completed, in a step S1302, the image signals are read out. At this time, signals of the respective pixels of the pixel area 201 are sequentially read out to the AD conversion unit 202, and the AD conversion unit 202 converts the signals of the respective pixels into digital pixel signals. The digital pixel signals obtained by the AD conversion are outputted to the black level correcting unit 205 via the switching unit 1201.

In a step S1303, the black level correcting unit 205 performs the black level correction processing with respect to the image signals, which are sequentially outputted from the AD conversion unit 202. Here, the black level correcting unit 205 performs the black level correction processing with respect to the image signals of the first frame by using a preset correction parameter. On the other hand, the black level correcting unit 205 performs the black level correction processing with respect to the image signals of the second and subsequent frames by using a correction parameter determined based on the image signals of the previous frame. In order to detect a high luminance subject, the image signals, with respect to which the black level correction processing is performed, are temporarily stored in the memory 203, and are also outputted to the display unit 106 or the like, which is provided outside the image pickup element 100, for moving image display.

In a step S1304, the controller 104 judges whether or not to end the moving image photographing. Whether or not to end the moving image photographing is judged based on whether or not the user inputted a photographing end instruction via the operating unit 108. In the case that the controller 104 judged YES in the step S1304, the controller 104 ends the processing of the flowchart of FIG. 13. On the other hand, in the case that the controller 104 judged NO in the step S1304, the controller 104 advances the processing to a step S1305.

In the step S1305, the high luminance detecting unit 204 reads out the image signals temporarily stored in the memory 203 and detects the position and the luminance level of the high luminance subject. In a step S1306, the correction parameter determining unit 206 determines the correction parameter such as the correction value obtaining area and the feedback gain based on the high luminance detection result information detected by the high luminance detecting unit 204. The determined correction parameter is used for the black level correction processing of the next frame. After the step S1306, the processing returns to the step S1301.

As described above, for example, in the moving image photographing, the live view photographing, etc., the black level correcting unit 205 determines the correction parameter for the black level correction of the next frame based on the high luminance subject detected by the high luminance detecting unit 204. As a result, the same effect as that of the first embodiment can be obtained, and the influence of the decrease in the dynamic range due to the dark current during the signal processing can be reduced.

Next, the third embodiment of the present invention will be described. In the second embodiment, the high luminance detection result information detected by the high luminance detecting unit 204 is reflected in the correction parameter when performing the black level correction with respect to the next frame. Therefore, in the case that the position of the high luminance subject changes between frames, there is a possibility that the accuracy of the black level correction processing performed by the black level correcting unit 205 decreases. Therefore, in the third embodiment, the correction parameter of the next frame is determined also in consideration of motion information of the high luminance subject.

Figure 14:
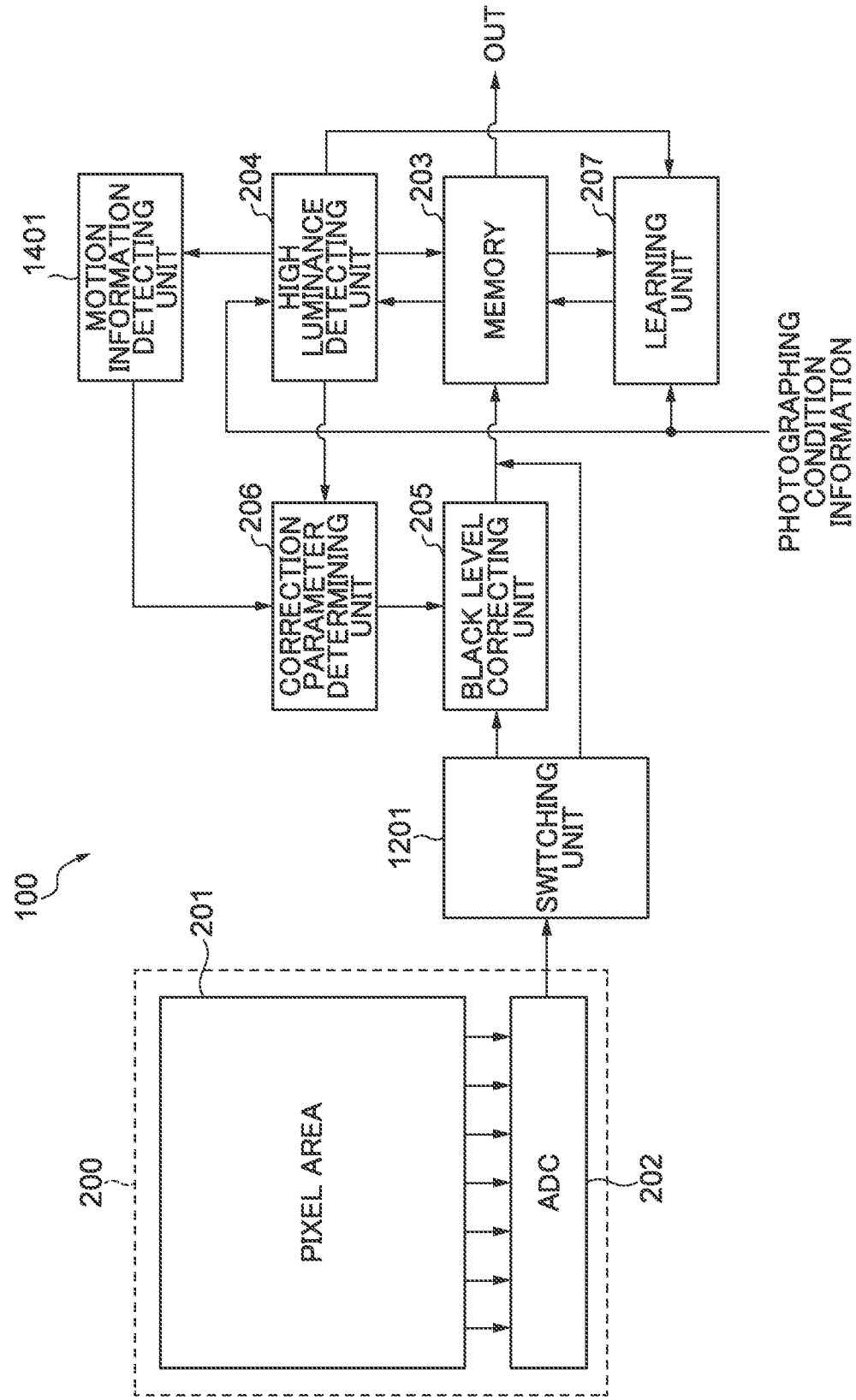
FIG. 14 is a diagram that shows an example of an image pickup element according to a third embodiment of the present invention.

FIG. 14 is a diagram that shows an example of an image pickup element 100 according to the third embodiment. In the configurations of FIG. 14, a motion detecting unit (a motion information detecting unit) 1401 is added to the configurations of FIG. 12. Since other configurations are the same as those in FIG. 12, the description thereof will be omitted. Position information of the high luminance subject detected by the high luminance detecting unit 204 is inputted into the motion detecting unit 1401. The motion detecting unit 1401 compares the positions of the high luminance subject between frames, and predicts the position of the high luminance subject in the next frame from the change. Position information of the high luminance subject in the next frame predicted by the motion detecting unit 1401 is outputted to the correction parameter determining unit 206. The correction parameter determining unit 206 determines the correction parameter such as the correction value obtaining area and the feedback gain also in consideration of the position information of the high luminance subject in the next frame outputted from the motion detecting unit 1401 (the predicted position information). As a result, even in the case that a high luminance subject moves between frames, it is possible to perform the black level correction processing with good accuracy.

Although the preferred embodiments of the present invention have been described above, the present invention is not limited to the above-described embodiments, and various modifications and changes can be made within the scope of the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-057793, filed Mar. 30, 2021, which is hereby incorporated by reference herein in its entirety.

What is claimed is:

1. An image pickup apparatus comprising:
at least one processor and/or circuit configured to function as:
inferring a luminance of a high luminance subject having a pixel signal saturation level or higher based on image signals generated from a plurality of pixels; and
determining an area for obtaining a correction value used when correcting the image signals and an area excluded from the area for obtaining the correction value among areas corresponding to optical black pixels included in the plurality of pixels, based on the inferred luminance of the high luminance subject.

2. The image pickup apparatus according to claim 1, wherein the luminance of the high luminance subject is detected by a learning model that is machine-learned by using first image signals and second image signals, and
wherein the second image signals are an image of a same scene as the first image signals and are darker than the first image signals.

3. The image pickup apparatus according to claim 2, wherein machine learning of the learning model is performed by including photographing condition information when photographing the first image signals and photographing condition information when photographing the second image signals.

4. The image pickup apparatus according to claim 3, wherein the machine learning of the learning model is performed by using the luminance of the high luminance subject detected based on a comparison between the first image signals and the second image signals, and the photographing condition information when photographing the first image signals and the photographing condition information when photographing the second image signals as teacher data.

5. The image pickup apparatus according to claim 2, wherein the first image signals are image signals obtained by photographing under a proper exposure condition, and the second image signals are image signals obtained by photographing the same scene as the first image signals under a dark exposure condition.

6. The image pickup apparatus according to claim 5, wherein in a case that a composition of the first image signals and a composition of the second image signals are different, the first image signals and the second image signals are not used for a machine learning of the learning model.

7. The image pickup apparatus according to claim 5, further comprising:
a display unit, and
wherein a message to prompt photographing under the proper exposure condition is displayed on the display unit, and
after the first image signals are obtained, a message to prompt photographing under an exposure condition darker than the proper exposure condition is displayed on the display unit.

8. The image pickup apparatus according to claim 1, wherein the area excluded from the area for obtaining the correction value is determined, based on the inferred luminance of the high luminance subject and a position of the high luminance subject.

9. The image pickup apparatus according to claim 1, wherein the area excluded from the area for obtaining the correction value is set so as to become wider as the luminance of the high luminance subject increases.

10. The image pickup apparatus according to claim 1, wherein with respect to areas within a certain range predetermined based on the area corresponding to the optical black pixels included in the image signals, a processing that infers the luminance of the high luminance subject is performed.

11. The image pickup apparatus according to claim 1, wherein the at least one processor and/or circuit further configured to function as:
correcting the image signals based on the correction value.

12. The image pickup apparatus according to claim 11, wherein image signals of the next frame are corrected based on the correction value.

13. An image pickup element comprising:
at least one processor and/or circuit configured to function as:
inferring a luminance of a high luminance subject having a pixel signal saturation level or higher based on image signals generated from a plurality of pixels; and
determining an area for obtaining a correction value used when correcting the image signals and an area excluded from the area for obtaining the correction value among areas corresponding to optical black pixels included in the plurality of pixels, based on the inferred luminance of the high luminance subject.

14. A control method for an image pickup apparatus, comprising:
a step of inferring a luminance of a high luminance subject having a pixel signal saturation level or higher based on image signals generated from a plurality of pixels; and
a step of determining an area for obtaining a correction value used when correcting the image signals and an area excluded from the area for obtaining the correction value among areas corresponding to optical black pixels included in the plurality of pixels, based on the inferred luminance of the high luminance subject.

15. A non-transitory computer-readable storage medium storing a program for causing a computer to execute a control method for an image pickup apparatus, comprising:
a step of inferring a luminance of a high luminance subject having a pixel signal saturation level or higher based on image signals generated from a plurality of pixels; and
a step of determining an area for obtaining a correction value used when correcting the image signals and an area excluded from the area for obtaining the correction value among areas corresponding to optical black pixels included in the plurality of pixels, based on the inferred luminance of the high luminance subject.

* * * * *